US005778366A

United States Patent [19]
Gillihan et al.

[11] Patent Number: 5,778,366
[45] Date of Patent: Jul. 7, 1998

[54] METHOD AND SYSTEM FOR ORGANIZING ON-LINE BOOKS USING COLLECTIONS

[75] Inventors: Dana L. Gillihan, Raleigh; Donald Ray Hyatt, Apex; Paul T. Leone, Raleigh; Kenneth M. Nordby, Cary; Victor Edward Pullizzi, Holly Springs; Thyra Lynne Rauch, Raleigh; Robert W. Rinda, Raleigh; Paula J. Spoth, Raleigh, all of N.C.

[73] Assignee: International Business Machines Corp., Armonk, N.Y.

[21] Appl. No.: 672,879

[22] Filed: Jun. 28, 1996

[51] Int. Cl.$^6$ .................................................. G06F 17/30
[52] U.S. Cl. .......................... 707/9; 707/1; 707/10
[58] Field of Search .......................... 707/7, 10, 532, 707/9, 1; 711/162; 312/9.14, 9.36, 9.23, 9.54; 395/858, 200.33

[56] References Cited

PUBLICATIONS

Computer Science Technical Reports (CS–TR) Project, Internet, http:/www.ncstrl.org/Dienst/htdocs/Inf/cstr-local.html, Computer Science Technical Reports, pp. 1–2, Dec. 1995.

Infoseek: Vatican Library, Internet, http://www.inforseek.com/Titles?qt=Vatican+library&col=WW&sv=N4&svx=nssb3, pp. 1–8, Jan. 1993.

Freie Universitaet Berlin, Library Information, Internet, http://duke.usak.ca/~;ladd/fu–berlin.html, Jun. 1995.

Search the Virtual MPPS–BOOK Library, University of Ghent, Belgium, Internet: http://mmps.rug.acbe/BoekenFind.html, pp. 1–10, May 1996.

Ensuring retrieval effectiveness in distributed digital libraries, Journal of Visual Communications and Image Representation, vol. 7, No. 1, pp. 61–73, Mar. 1996.

Digital library system for computer scientists, Networked Computer Science Technical Report Library, Information Today, v. 13, p. 22, Feb. 1996.

Primary Examiner—Thomas G. Black
Assistant Examiner—Diane D. Mizrahi
Attorney, Agent, or Firm—A. Bruce Clay

[57] ABSTRACT

A collection is defined for use with a virtual library comprising electronic documents. An administrator pre-assigns electronic documents meeting a specific criteria to a directory. The directory is then associated with a descriptive collection name allowing a user to see documents relating to a topic.

9 Claims, 5 Drawing Sheets

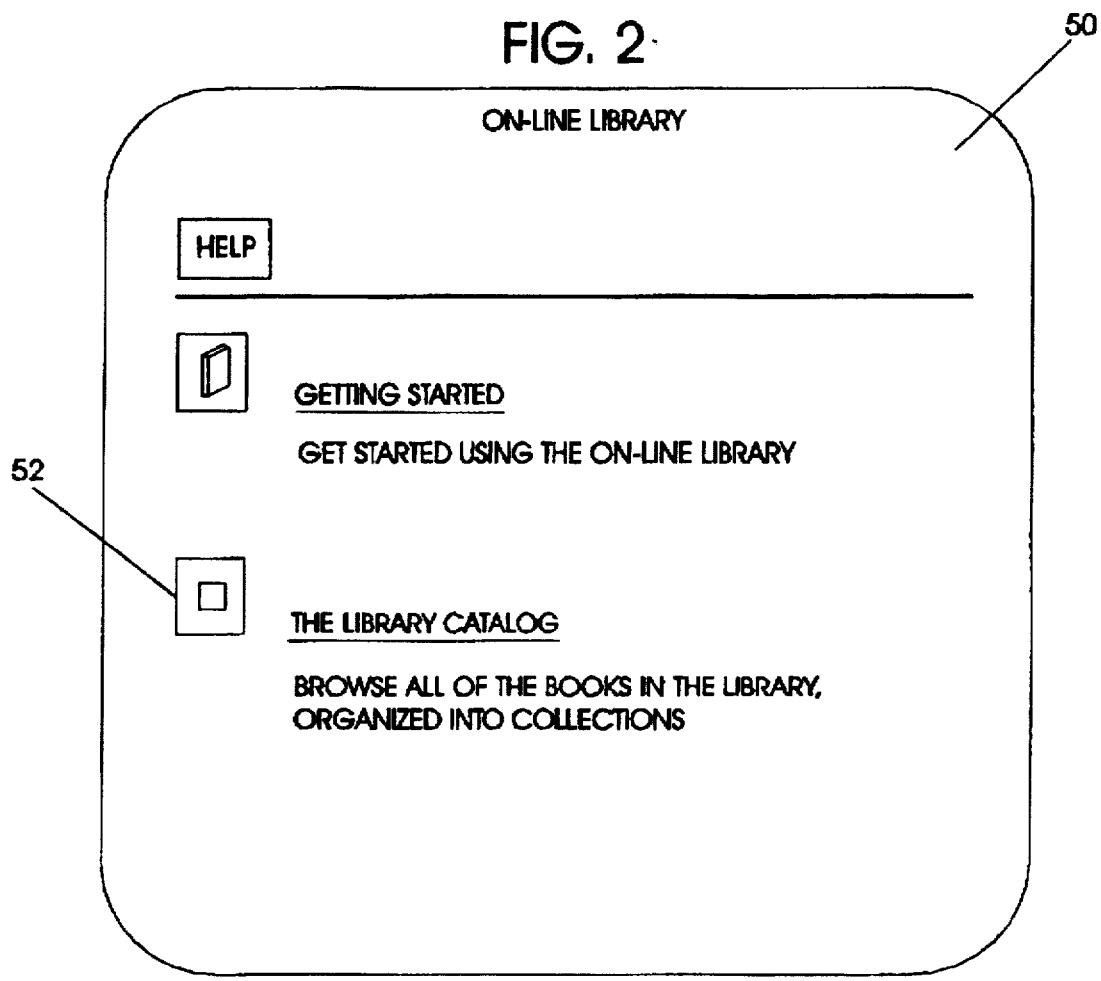

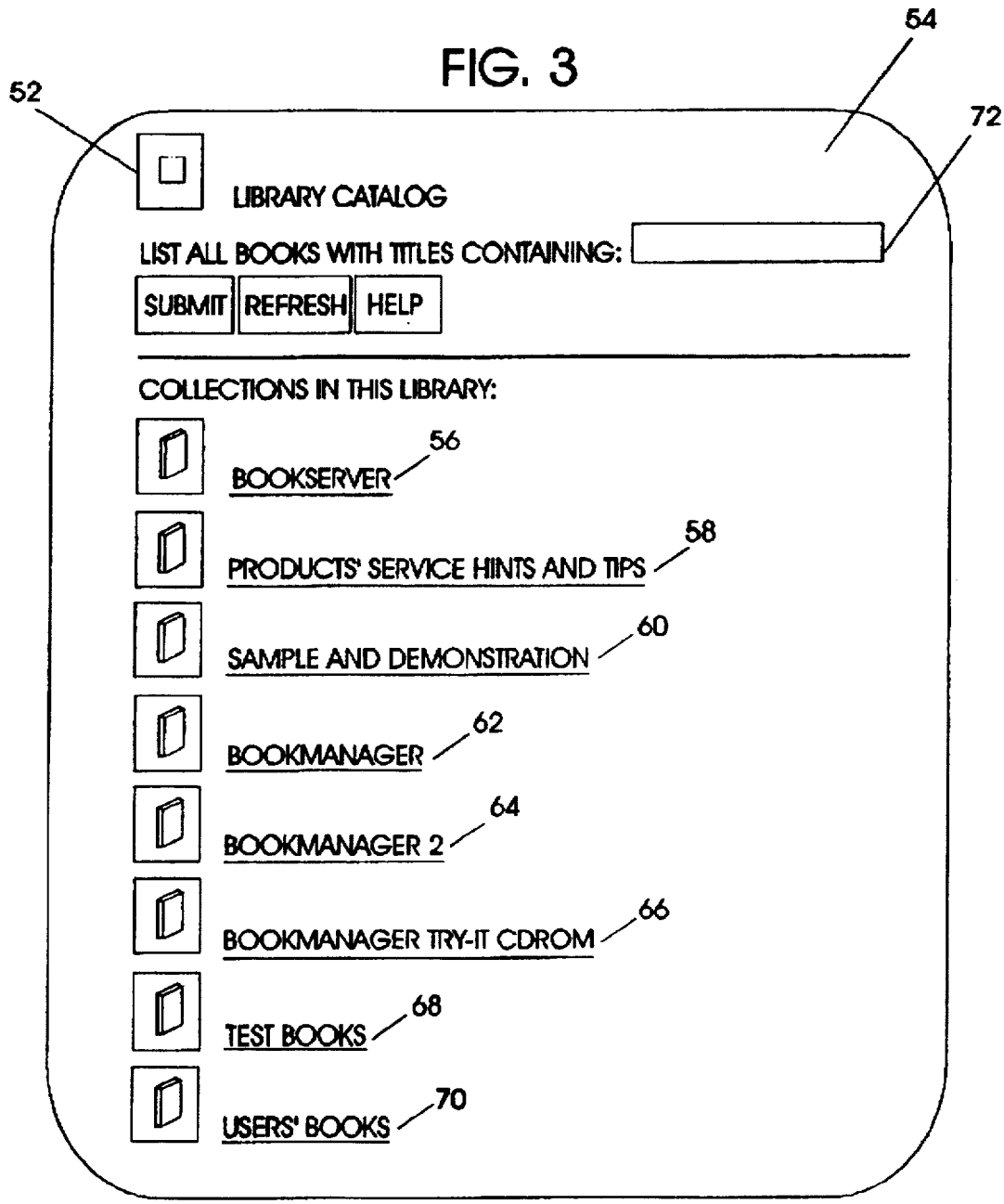

FIG. 4

COLLECTION: ALL BOOKS

LIST BOOKS WITH TITLES CONTAINING: [WORLD WIDE WEB]

[SUBMIT] [REFRESH] [HELP]

THE BOOKSERVER COLLECTION... —56 cphw2m00 - IBM BOOKMANAGER BOOKSERVER FOR WORLD WIDE WEB FOR OS/2: GETTING STARTED —74

10/05/95 09:12:27 SC34-3078-02

TOTAL BOOKS = 1

THE TEST BOOKS COLLECTION... —68 booksrv - IBM BOOKMANAGER BOOKSERVER FOR WORLD WIDE WEB FOR OS/2: GETTING STARTED —76

04/24/96 16:47:50 SC34-3078-00 cpHW2dan - IBM BOOKMANAGER BOOKSERVER TIL WORLD WIDE WEB TIL OS/2 KOM GODT I GANG —78

08/28/95 12:14:53 S511-5611-00 ephw2deu - IBM BOOKMANAGER BOOKSERVER FÜR WORLD WIDE WEB FÜR OS/2 ERSTE SCHRITTE —80

08/22/95 15:57:55 SC12-2358-00

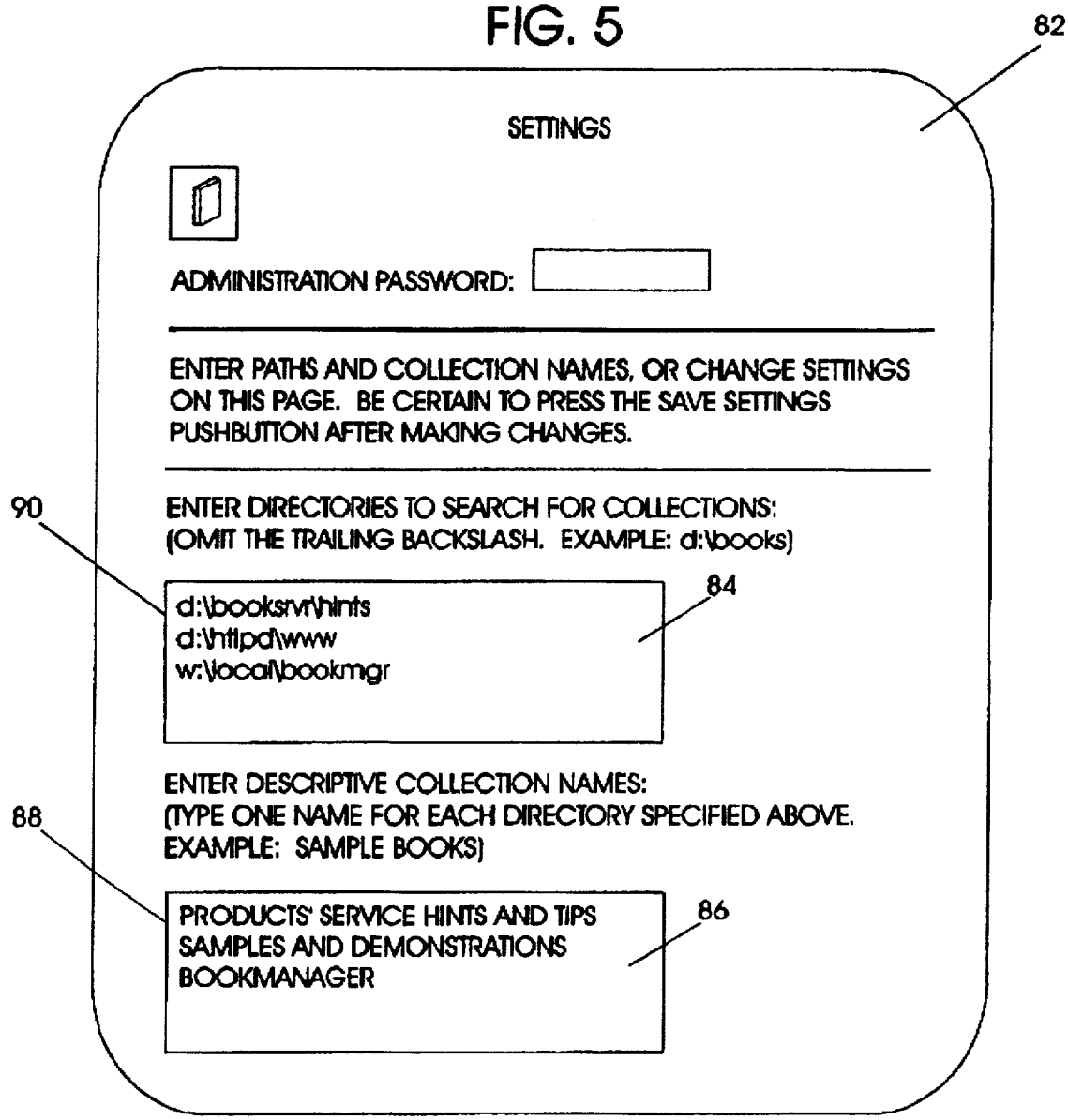

METHOD AND SYSTEM FOR ORGANIZING ON-LINE BOOKS USING COLLECTIONS

FIELD OF THE INVENTION

This invention relates in general to computer software, and in particular to a method and system for organizing on-line softcopy books using collections.

BACKGROUND OF THE INVENTION

As a result of the proliferation of computer systems including LANs and the Internet, organizations both large and small transfer, store, and utilize many on-line electronic documents. The past several years have seen dramatic growth toward the use of the Internet/Intranet as a medium for electronic publishing. Thus, on-line documents can quickly become overwhelming in volume and variety to a user. As a result, software products such as, IBM's Book-Manager have been made available to assist users in building on-line documents into books, and organizing those books into a virtual library. When books are built, they are compressed and indexed for rapid searching. Due to such products, the ability to search electronically for needed information has become one important advantage of an on-line book over a hardcopy book.

Many search engines have been devised to assist in searching for needed information. However, in an on-line book system if you do not know which book contains the desired information, or if you are looking for a particular book, but do not recall its name, a user may require additional help. For example, CD-ROM's are distributed on a quarterly basis for the IBM MVS collection kit. Each new kit may contain thousands of electronic books that, when added to previous versions can be overwhelming. Thus, unless the exact title or version is remembered, a user may have to look through each title to find the required one.

When these multiple books are available in an organization having access thereto over a LAN or over the Internet/Intranet, there is the added possibility that individuals will keep outdated versions on their desktop. Thus it becomes important for an organization to ensure that only the most recent version of a book is available. Therefore, there is a need for a method and system for organizing on-line books using collections that can be controlled by a single source such as an administrator.

SUMMARY OF THE INVENTION

The present invention disclosed herein comprises a method and system for organizing electronic documents which greatly reduces problems associated with prior library managers. The present invention allows electronic documents meeting a defined criteria to be grouped into a collection.

In accordance with one aspect of the present invention, electronics documents in an on-line computer system library are organized. At least one collection name is designated. Electronic documents meeting a predetermined criteria are assigned to a directory. The directory is then associated with the collection name allowing a user to find documents in the collection.

BRIEF DESCRIPTION OF THE DRAWINGS

For a more complete understanding of the present invention and for further advantages thereof, reference is now made to the following Detailed Description taken in conjunction with the accompanying drawings, in which:

FIG. 2 is a graphical representation of a user interface for gaining access to use of the present invention;

FIG. 3 is a graphical representation of collections in accordance with the present invention;

FIG. 4 is illustrates the results of a search utilizing the present invention; and FIG. 5 is a graphical representation of the administrator interface utilizing the present invention.

DETAILED DESCRIPTION OF THE INVENTION

Figure 1:
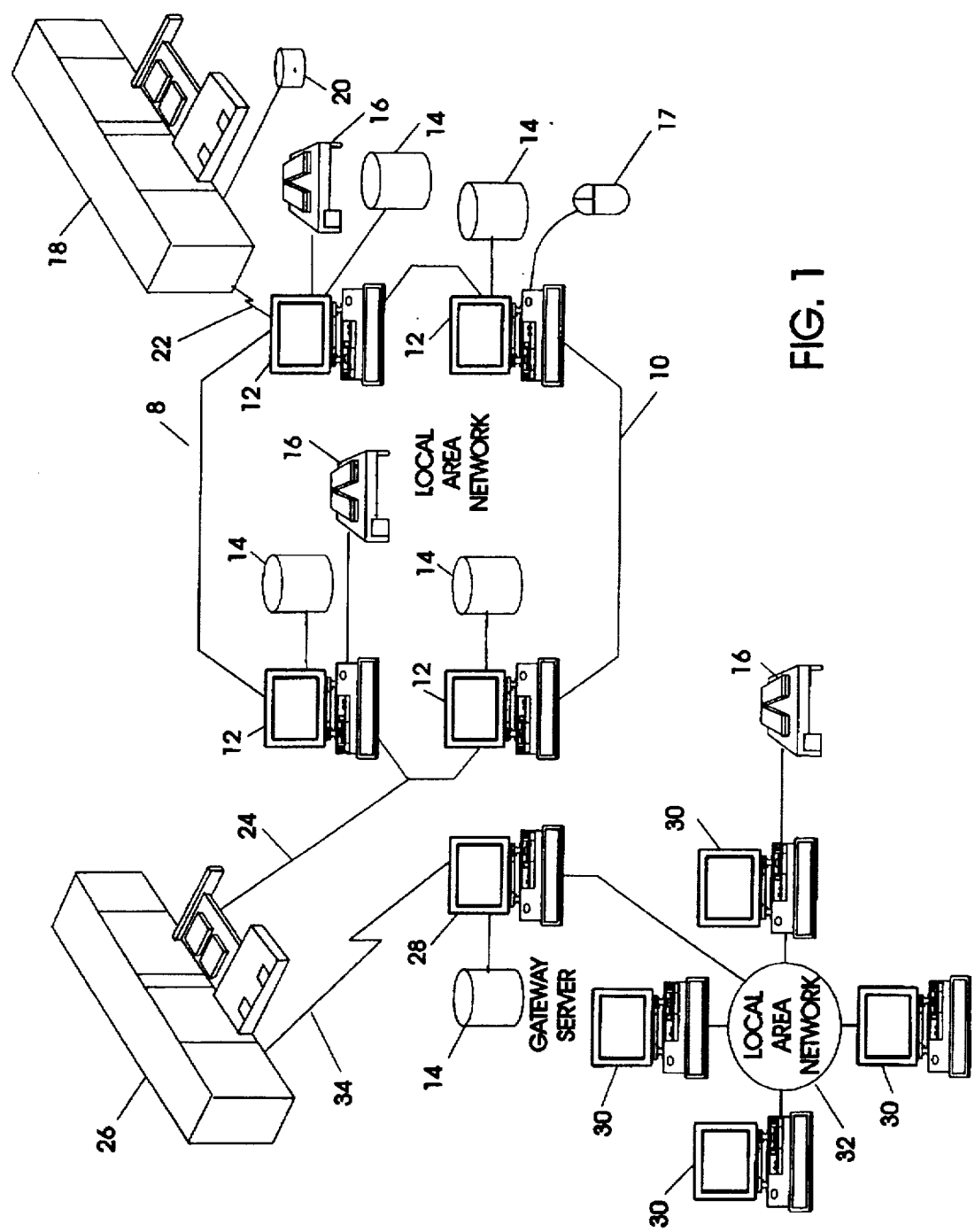
FIG. 1 is a pictorial representation of a data processing system which may be utilized to implement a method and system of the present invention.

Referring to FIG. 1, there is depicted a graphical representation of a data processing system 8, which may utilized to implement the present invention. As may be seen, data processing system 8 may include a plurality of networks, such as Local Area 5 Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects maybe stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from a which a developer may access the code for distribution purposes, the software program code may be embodied on any of a variety of known media for use with a data processing system such as a diskette or CD-Rom or may be distributed to users from a memory of one computer system over a network of some type to other computer systems for use by users of such other systems. Such techniques and methods for embodying software code on media and/or distributing software code are wellknown and will not be further discussed herein.

The instant embodiment described herein uses a virtual library supplied over a net and controlled by an administrator through a server device. Referring to FIG. 2, a graphical representation of a user interface for gaining access to use of the present invention is shown on a computer screen 50. For example, the screen 50 could provide access to an on-line BookManager/BookServer library. By selecting, for example, an icon 52, a user would be taken to a screen showing defined collections. Thus, a virtual library may be visually represented to a user. In addition, the user will be assisted in organizing and managing the books they use.

Referring to FIG. 3, after having selected the icon 52 of FIG. 2, a panel, such as indicated by reference numeral 54, is presented to the user. In accordance with the present invention, a listing of collections is shown. For example, collections in the library shown in panel 54 comprise "BOOKSERVER" 56, "PRODUCTS SERVICE HINTS AND TIPS" 58, "SAMPLE AND DEMONSTRATION" 60, "BOOKMANAGER" 62, "BOOKMANAGER 2" 64, "BOOKMANAGER TRY-IT CDROM" 66, "TEST BOOKS" 68, and "USERS' BOOKS" 70. The collections in the library are organized to assist a user in finding a book stored electronically.

A search field 72 is provided on the panel 54 to enter a search string. Collections can be searched by book titles, file names or document numbers. For example, if the user is looking for a book which it is known that the words "WORLD WIDE WEB" appears in the title, the user may enter this search string into the field 72. Upon entering such a search, the results as shown in FIG. 4 are provided. For example, in the BOOKSERVER 56 collection, one book is found matching the search string (ie., IBM BOOKMANAGER BOOKSERVER FOR WORLD WIDE WEB FOR OS/2: GETTING STARTED, as indicated by reference numeral 74). In addition, the TEST BOOK 68 collection has a plurality of books (additional screens, not shown, would be used to list any other books found by the search) including: IBM BOOKMANAGER BOOKSERVER FOR WORLD WIDE WEB FOR OS/2: GETTING STARTED, generally indicated by reference numeral 76; IBM BOOKMANAGER BOOKSERVER TIL WORLD WIDE WEB TIL OS/2 KOM GODT I GANG, generally indicated by the reference numeral 78; and IBM BOOKMANAGER BOOKSERVER FOR WORLD WIDE WEB FOR OS/2 ERSTE SCHRITTE, generally indicated by the reference numeral 80. Thus, by looking at the titles found by the search, the user is able to scroll through the list and locate the book being sought. As a result of the present invention, the user is, able to scroll through books in a collection meeting the search request rather than searching through an entire listing of all the books in a library which may include hundreds or even thousands of titles.

Referring to FIG. 5, an administrator panel 82 is illustrated. Using the panel 82, the system administrator may set up collections that comprise the library catalog. For example, in the box 84, the administrator would enter directories to search for books to make up each collection. Thus, for example, an administrator would pre-select books referring to a specific subject matter (such as service and tips) and place those books in a specific directory. Alternatively, if a CD-ROM contained books dealing with only a specific subject, the administrator could place all those books into a specific directory. In box 86, the administrator would enter the "collection" title to correspond to the directories entered in box 84. Thus, for example, the collection PRODUCTS SERVICE HINTS AND TIPS, indicated by reference numeral 88, will contain books found (i.e., pre-placed) in "d:\booksrvr\hints", indicated by reference numeral 90.

Collections are dynamic in nature, and their contents are determined by the books stored at any given time in their defining directory. For the user, collections can be easily and quickly modified to contain the most current documents if version control is an issue. Collections can be updated quickly because no intermediate step on the part of the user is required to convert books to HTML if books are served over the World Wide Web.

For example, as a result of the present invention, a product such as the IBM BookManager BookServer for WWW for OS/2 will enable customers to provide entire libraries of documents via the Internet/Intranet. The BookServer product can serve information to HTML browsers connected to the World Wide Web or their own internal network. In accordance with the present invention, this information is then stored in a virtual library comprised of books, and sets of books called collections. The book metaphor provides an easy to understand and intuitive model for a user unfamiliar with on-line viewing tools. BookServer provides fuzzy, Boolean and morphological full-text searching across entire documents and collections, not just the currently loaded HTML file. A single server can serve collections from its own or from multiple file storage via remote systems. The actual location is not part of the URL of a document and is transparent to the user. Collections can be viewed across the Web or by LAN connected workstations on multiple platforms from the same library.

Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of searching electronic on-line books in a bounded on-line computer system library, comprising the steps of:

designating at least one collection name, said name providing an indication as to contents thereof;

assigning electronic on-line books within the bounded library meeting a predetermined criteria to a directory;

associating said directory with said collection name, initiating a search within the bounded library; and presenting results from said search sorted by collection name, wherein a user may find a desired one of the electronic on-line books in the bounded library under an appropriate collection name such that said results may be examined without need to search through all on-line books in said bounded library meeting the search.

2. The method of claim 1, wherein said step of assigning comprises:

an administrator assigning the on-line books to said directory.

3. The method of claim 1, wherein said step of assigning further comprises:

assigning a location to said directory.

4. A system for searching electronic on-line books in a bounded on-line computer system library, comprising:

means for designating at least one collection name, said name providing an indication as to contents thereof;

means for assigning electronic on-line books within the bounded library meeting a predetermined criteria to a directory;

means for associating said directory with said collection name;

means for initiating a search within the bounded library; and means for presenting results from said search sorted by collection name, wherein a user may find a desired one of the electronic on-line books in the bounded library under an appropriate collection name such that said results may be examined without need to search through all on-line books in said bounded library meeting the search.

5. The system of claim 4, wherein said means for assigning comprises:

means for an administrator assigning the on-line books to said directory.

6. The system of claim 4, wherein said means for assigning further comprises:

means for assigning a location to said directory.

7. A computer program product recorded on computer readable medium for searching electronic on-line books in a bounded on-line library, comprising:

computer readable means for designating at least one collection name, said name providing an indication as to contents thereof;

computer readable means for assigning electronic on-line books within the bounded library meeting a predetermined criteria to a directory;

computer readable means for associating said directory with said collection name;

computer readable means for initiating a search within the bounded library; and computer readable means for presenting results from said search sorted by collection name, wherein a user may find a desired one of the electronic on-line books in the bounded library under an appropriate collection name such that said results may be examined without need to search through all on-line books in said bounded library meeting the search.

8. The program product of claim 7, wherein said computer readable means for assigning comprises:

computer readable means for an administrator assigning the on-line books to said directory.

9. The program product of claim 7, wherein said computer readable means for assigning further comprises:

computer readable means for assigning a location to said directory.

* * * * *